May 9, 1950  R. PLATH  2,506,939
AIRCRAFT CONTROL SURFACE
Filed Jan. 29, 1947

INVENTOR.
ROBERT PLATH
BY Reynolds & Beach
ATTORNEYS

Patented May 9, 1950

2,506,939

UNITED STATES PATENT OFFICE 2,506,939

AIRCRAFT CONTROL SURFACE

Robert Plath, Seattle, Wash., assignor to Boeing Airplane Company, a corporation of Delaware Application January 29, 1947, Serial No. 725,127

17 Claims. (Cl. 244—90)

It has been common practice heretofore to balance control surfaces aerodynamically for the purpose of reducing the effort required to swing them in one direction or the other from alignment with a fixed airfoil located ahead of and supporting the control airfoil. Early balanced control surfaces included a portion ahead of the axis of the control surface hinge which would project outward into the air stream beyond the side surfaces of the fixed airfoil when the control surface was swung. Later such balance portions were made of a chordwise extent such that when the control surface was sung to its extreme position the balance portion did not project beyond the surface of the fixed airfoil. Such a construction, however, has the tendency of reducing the amount of balance effect on the airfoil.

Particularly for ailerons, a still later development provided a balance portion of the control surface received in a cavity of the fixed airfoil, so that it was not exposed to the actual flow of air over the surfaces of the fixed airfoil and the control surface, but nevertheless was subjected to differential static pressures created by such air flow. A great disadvantage of this type of construction was the difficulty of designing the supporting framework for the trailing portion of the stationary airfoil so that it would have sufficient strength, yet would still leave an unobstructed cavity in which the balance portion of the control surface could move.

An object of the present invention is to reduce the effort required to swing a control surface, pivotally mounted on the trailing portion of a fixed airfoil, out of alignment with the fixed airfoil by structure which will not occupy space desirable for the framework of the fixed airfoil, yet the mechanism accomplishing this result will be entirely enclosed.

A further advantage of my control surface construction is that the loads on it may be reduced considerably, so that it may be made of lighter construction without reducing its exterior area subjected to the air flow of its aerodynamic effectiveness.

Heretofore, as far as I am aware, the function of all control surface balancing structures has been, as the name implies, in some manner to exert on the control surface a force in the direction to produce a turning moment about the hinge axis of the control surface in a sense opposing, and therefore partially counteracting, the moment created by the force exerted on the control surface rearward of its hinge axis by the flow of air over its surfaces. It is an object of my invention, on the contrary, to lighten or to relieve load on the control surface rearwardly of its hinge axis, thus to reduce directly the moment produced rearwardly of the hinge axis, rather than to apply to the control surface a counter-balancing load.

It is a further object of my invention to house within the control surface all the structure effective to relieve the control surface load.

While the principles of my invention may be applied to any control surface of an airplane, such as ailerons, elevators, rudders, and even flaps, it is perhaps most useful in conjunction with the ailerons. The structure used for accomplishing the novel results discussed above may take various forms, and for purposes of illustration three different types of construction which may be employed are shown in the drawings. It will be understood, however, that these examples are merely representative, and that the desired result may be achieved in a variety of ways, just as internal control surface balances have embodied different types of construction.

Ailerons in particular have presented a difficult balancing problem in order to reduce the control forces required to swing them without disturbing the smooth flow of air around the composite wing and aileron airfoil, which would decrease the efficiency of the wing. For that reason in particular, internal balances have been proposed especially for ailerons, but, as mentioned above, they have heretofore presented a problem of wing framework structure design, because such internal balances occupied a large cavity in the wing required to be free of bracing members. That problem of structural design is eliminated where my construction is used.

Figure 1:
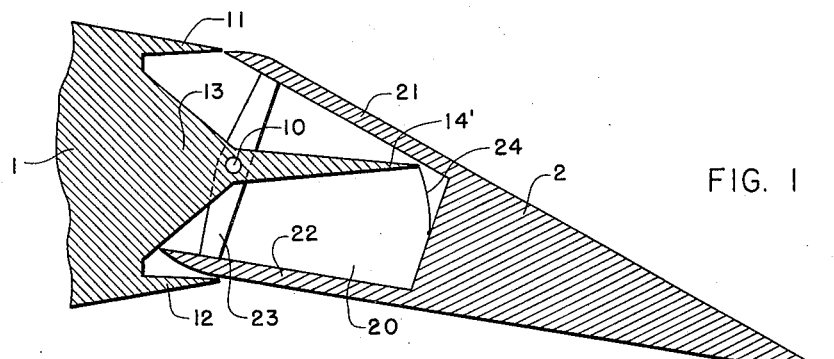
Figure 1 is a longitudinal sectional view showing, largely diagrammatically, the trailing portion of a fixed airfoil having a control surface mounted on it illustrating one embodiment of my invention.

An aileron installation icorporating mechanism in its simplest form for carrying out my invention is shown in Fig. 1. While both the wing 1 and aileron 2 are represented diagrammatically as being solid, it will be understood that such illustration is merely symbolic of conventional internal wing and aileron construction. The important feature is that all the crosshatched area of the wing and aileron is available for truss and bracing framework.

In Fig. 1 it will be seen that the entire thickness of the wing 1 rearwardly very close to the pivot 10 of the aileron hinge is available to accommodate framework. The upper and lower surfaces of the wing are extended substantially as far rearward as the aileron hinge axis in the form of an upper wing flange 11 and a lower wing flange 12. While recesses extending lengthwise of the wing's trailing portion are formed beneath these flanges, the rearwardly projecting hinge mounting 13 of the wing, located centrally between its upper and lower surfaces, which carries the aileron hinge, tapers rearwardly very rapidly from the main body of the wing, so that it is of rugged construction.

In the aileron construction shown in Fig. 1 the rearward portion of the aileron, constituting the major part of its surface area, is of conventional construction. The forward portion of the aileron, however, somewhat exceeding one-third of its chord in the form illustrated, has a central cavity 20 open at the leading edge of the aileron. This cavity, formed between an upper aileron flange 21 and a lower aileron flange 22 projecting forwardly from the body of the aileron, may be made of greater or lesser chordwise extent, depending upon the degree of control force reduction to be effected by my invention. The aileron hinge is preferably located close to its leading edge, and may support the aileron by spar members 23 secured by their upper and lower extremities to the aileron flanges 21 and 22, respectively, and spanning the forward portion of the cavity 20. These aileron flanges may be made relatively thin because the air pressures acting on the opposite sides of each of them are substantially equal.

The air load on a control surface, such as an aileron, opposing its deflection from alignment with the fixed airfoil ahead of it is caused by the differential pressures produced by the air flow on the opposite sides of the control surface by such deflection. As a control surface is swung, the pressure increases on its side toward which it is swung and decreases on its side away from which it is swung. When an aileron is swung downward, as shown in Fig. 1 for example, the pressure on the lower surface will increase while the pressure on the upper surface will decrease. The moment calculated by multiplying the difference in pressure on these two surfaces by the distance between the center of pressure and the axis of hinge 10, is equal to the torque which must be produced by the control force and transmitted to the aileron to hold it deflected in a position in which such pressure differential is created.

Prior art balance mechanisms have not reduced the air pressures acting on the opposite sides of a control surface, or the difference between such pressures, but on the contrary, especially for internal balances, had increased that pressure difference by virtue of adding control surface area forward of the hinge axis. The reduction in torque required to swing the control surface, or to hold it deflected, resulted from locating the hinge line closer to the center of pressure on the control surface, but in order to provide sufficient air reaction surface, especially in an internally balanced aileron, the area behind the control surface hinge line could not be reduced appreciably.

The construction of my invention operates on an entirely different principle, in that the force differential acting on the opposite sides of the control surface, which resists swinging of the control surface from its neutral position or maintenance of it in a given position deflected from neutral position, itself is reduced, which in turn reduces the hinge line moment even though the location at which the resultant force acts may be farther from the hinge axis. Nevertheless the entire area of the control surface remains aerodynamically effective to produce control forces.

By my invention the reduction in effective air pressure differential on opposite sides of the control surface is accomplished by transferring directly to the fixed airfoil structure a portion of the unbalanced force which normally acts on the control surface to produce a turning moment on its hinge. In Fig. 1 the fixed airfoil structure to which such unbalanced force portion is transmitted is shown in the form of a fin or vane extension 14' integral with the wing 1 and projecting rearwardly beyond the hinge 10 substantially to the rearward side of the cavity 20. The gap between the trailing edge of this vane and the central portion of the rear wall of the aileron cavity is closed by a membrane 24 of cloth or other flexible material, which preferably is not permeable by air. The fixed airfoil vane and the membrane cooperate to form a partition dividing the aileron cavity 20 fore and aft into two portions generally at opposite sides of its chord line. These two cavity portions are sealed against direct intercommunication by such partition.

It will be noted that the upper and lower aileron flanges 21 and 22 are located and shaped to move into the recesses at the trailing edge of the fixed airfoil formed beneath its rearwardly projecting upper and lower flanges 11 and 12, respectively. Sufficient clearance between the control surface flanges and the fixed airfoil flanges is allowed, however, to afford communication through such clearance space between each portion of the cavity 20 and the exterior portion of the control surface adjacent to it, for the purpose of equalizing the air pressures at the opposite sides of each of the control surface flanges 21 and 22. As the aileron 2 is swung downward to effect an increase in pressure on its lower surface by the resultant aerodynamic reaction, the pressure within the aileron cavity between the lower aileron flange 22 and the wing vane 14' will increase correspondingly. Similarly, of course, the air pressure on the inner side of the lower wing flange 12 will increase. Conversely, as the air pressure on the upper side of the aileron is reduced by such manipulation, the air pressure in the cavity 20 between the upper aileron flange 21 and the fixed airfoil vane will decrease correspondingly.

It will be evident that, irrespective of any increase in air pressure on the lower side of the aileron 2 produced by swinging it downward, no force resisting such swinging can occur on the lower aileron flange 22 because of the equalization of air pressures on its opposite sides. Similarly, no moment will be created on the aileron by any reduction in pressure on the upper side of the aileron flange 21, because of the equalization of the pressure on its inner side. The air pressure in that portion of the aileron cavity 20 beneath the fixed airfoil vane 14 will, of course, be greater than the air pressure in the portion of such cavity above that vane, when the aileron is swung downward to the position shown, but the differential of such unequal pressures will merely produce a shearing force and bending moment on such fixed vane, which cannot exert a turning moment on the aileron. In addition the unequal pressures in these two cavity portions will produce a force on the membrane 24 which may cause a slight, but negligible, force on the aileron at the point of attachment of the membrane to the rearward wall of the cavity 20.

The only force differential resisting swinging of the aileron 2, or tending to swing it back to its neutral position, therefore, will be the difference between the superior air pressure on that portion of the lower face of the aileron between the rear wall of the aileron cavity 20 and the trailing edge of the aileron, and the inferior air pressure on that portion of the upper face of the aileron between such cavity wall and the aileron's trailing edge. If the chordal extent of cavity 20 is one-third of the total chord of the aileron, the force resulting from the differential in the air pressures on opposite sides of the aileron of Fig. 1 will be only that acting on two-thirds of the area on which pressure producing a moment would act in the absence of the partitioned cavity of my invention. That does not mean, of course, that the moment of the control surface about the hinge axis would be reduced by one-third, because the location at which the resultant pressure acts, or the center of pressure of that portion of the aileron behind the cavity, would be farther from the hinge axis.

Figure 3:
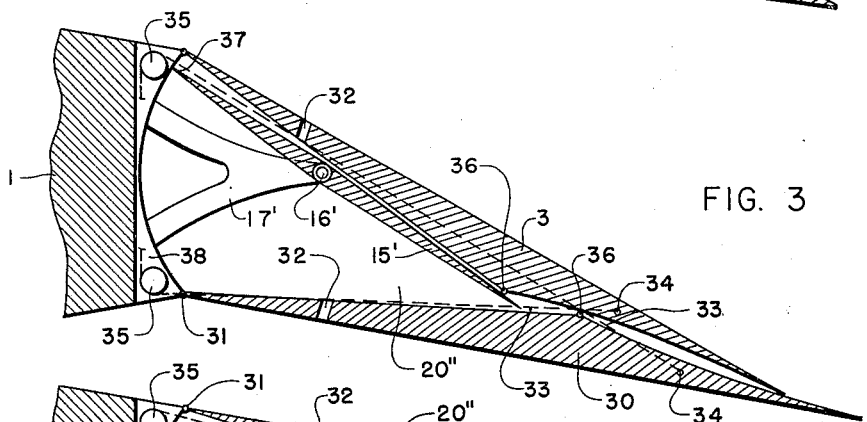
Figures 3 and 4 are longitudinal sectional views through the trailing portion of a fixed airfoil and control surface, showing, largely diagrammatically, a different type of control surface associated with structure for carrying out my invention.
Figure 4:
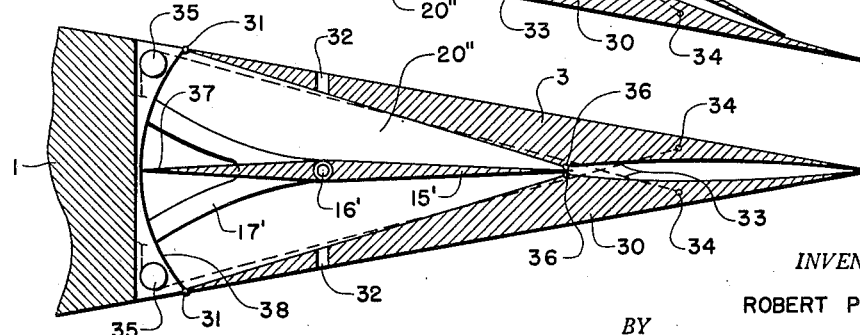

In many instances it would, of course, be desirable to reduce the control surface moment to a greater extent. This result cannot be accomplished merely by increasing the chordal extent of the cavity 20 and the length of the fixed vane 14 in a construction of the type shown in Figure 1, because, if the vane were extended rearwardly substantially to the rear wall of the cavity, the angle of swing of the control surface would be limited too greatly by engagement of its flanges 21 and 22 with the trailing edge of the vane. A much greater reduction in the control force can, however, be accomplished by employing a cavity partition incorporating a swingable vane, such as shown in the forms of Figs. 2, 3 and 4.

Figure 2:
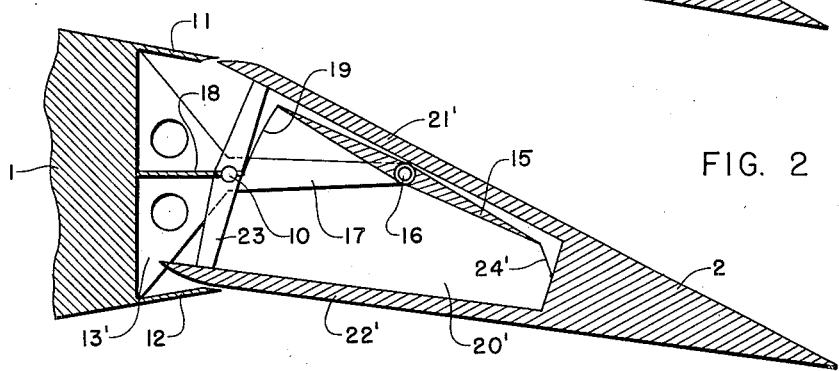
Figure 2 is a longitudinal sectional view similar to Figure 1 through the trailing portion of a fixed airfoil and a control surface incorporating a different type of mechanism utilizing my invention.

The construction of the wing 1 and its flanges 11 and 12 in Figure 2 is substantially the same as that shown in Figure 1. In this instance, however, the aileron hinge 10 is supported by a plate structure 13' replacing the trusswork 13 represented diagrammatically in Fig. 1. Likewise the aileron 2 is carried by spar members 23 mounted on the hinge 10, the extremities of which spar members are secured to the aileron flanges in the same manner as in Fig. 1. The only difference of the aileron shown in Fig. 2 over that of Fig. 1 resides in the length of the flanges 21' and 22' which is greater than that of the flanges 21 and 22.

The vane 15, constituting the major portion of the fore and aft partition between the upper and lower portions of the recess 20' in the aileron of Fig. 2, instead of being fixed, is mounted on and swingable or tiltable about a pivot 16, in turn carried by fixed arms 17 integral with the aileron hinge supporting plates 13'. As in the construction of Fig. 1, the gap between the trailing edge of the vane 15 and the rearward side of the cavity 20' is closed by a membrane 24'. Since the vane 15 will swing as the aileron swings, pulled by such membrane, to maintain a position generally parallel to the aileron flanges 21' and 22', a gap would normally be formed between its leading edge and a stationary divider plate 18 separating the cavities beneath the wing flanges 11 and 12. This gap is closed by a second membrane 19, which preferably is impervious to air flow, as is the membrane 24'.

In a construction such as shown in Fig. 2, again the air pressures on the opposite sides of the aileron flanges 21' and 22' are equalized, so that the loads on these parts are small, enabling them to be made quite thin and light. As in the form of Fig. 1, when the aileron is swung downwardly, for example, the air pressure in the lower portion of the cavity 20' will be greater than the air pressure in the upper portion of that cavity, but the force of the resulting pressure differential will be exerted directly upon the vane 15 and the membranes 19 and 24'. The force of the pressure differential acting on membrane 19 will be transmitted directly to the partition plate 18 and to the vane 15, and the latter force, as well as that resulting from the pressure differential acting directly on the vane, will be exerted upon the arms 17 and thus transmitted to the wing structure independently of the aileron. Only the differential of the pressures acting on those portions of the aileron sides rearwardly of the rear wall of the cavity 20' will therefore produce a turning moment about the hinge axis of the aileron.

In a structure having approximately the proportions shown in Fig. 2 the pressure differential acting on opposite sides of the aileron 2 will be effective over only about 44% of the aileron area, or less if the aileron tapers rearwardly in plan form, as frequently is the case. Again the distance between the position at which the resultant force acts and the hinge axis for the aileron of Fig. 2 would be greater than for the conventional type, however, but despite this greater distance the reduction in moment produced by the air loads on the aileron of Fig. 2 when swung is very substantial over that on a conventional unbalanced aileron.

The reduction in moment produced by the air loads on the split type control surface shown in Figs. 3 and 4 would be generally comparable to the reduction achieved by the construction of Fig. 2. In this instance the aileron is composed of an upper element 3 and a lower element 30 of equal chordwise extent, as shown in Fig. 4. Between these plate-like elements is formed the cavity 20'' which is divided fore and aft into upper and lower chambers by the swingable vane 15', mounted on a pivot 16' which is carried by supporting brackets 17' fixed to the wing 1, generally comparable to the vane mounting arms 17 of Fig. 2.

Each of the aileron plates 3 and 30 is supported by a hinge 31 carried by the wing at its upper and lower surfaces so that the outer sides of such plates constitute continuations of the wing surfaces. Since there is no space between the leading edges of these aileron plates and the wing, apertures 32 are provided through the forward portion of each plate, to afford communication between the cavity 20'' and the outer sides of the aileron elements.

The aileron plates 3 and 30 are interconnected for conjoint swinging to effect control movement of the composite aileron by control cables 33 secured to such elements at points 34 near their trailing edges. These control cables are crossed and extend around pulleys 35 located adjacent to the wing surfaces, over which pulleys the cables are guided into the interior of the wing. To swing the aileron plates downward the control cable attached to the upper plate 3 will be shortened, while that attached to the lower plate 30 will be lengthened, as shown in Fig. 3. The trailing edges of the aileron elements have concave inner surfaces to enable such trailing edges to lie close together when that of one element projects beyond that of the other element during swinging of such elements.

The rearward portion of the cavity 20" is sealed both between the cooperating aileron plates 3 and 30 and between one of such plates and the partition vane 15' by sealing strips 36 of rubber or equivalent material, secured along an inwardly projecting crest of each plate. When the aileron elements are swung conjointly to one side the sealing strip of the element toward which such elements are swung seals the space between the two elements, while the strip carried by the aileron element on the side away from which they are swung effects sealing engagement with the vane 15'.

Because the leading edges of the aileron plates 3 and 30 do not move into the cavity 20", the gap between the leading edge of the swinging vane 15' and the wing 1 may be sealed by a wiping seal strip 37 carried by such vane edge, which bears against a wall 38 defining the rearward portion of the wing 1. Alternatively a membrane like the membrane 19 shown in Fig. 2 could be used to seal the gap between the leading edge of the vane 15' and the wing. It is not essential that an absolutely tight seal be maintained between the two parts of the cavity 20", however, because any slight leakage which might occur from the high pressure side of the aileron to the low pressure side through the apertures 32 and the aileron cavity would not noticeably affect the air flow around the aileron, or the effectiveness of its controlling action.

It will be noted that the chordal extent of vane 15' rearwardly of its pivot 16' is greater than its extent forwardly of such pivot. Consequently the differential in the pressures on the portion rearwardly of such pivot will exceed the differential in the pressures on the portion forwardly of such pivot when the vane is swung, to create a moment on it tending to swing it toward neutral position, which will exert a slight force on the aileron element which it engages, tending to swing such element also toward neutral position. The pressure thus produced on the aileron element is not sufficiently great to increase substantially the control force required to swing the aileron elements or to hold them in a given swung position, however, but it is sufficient to press the vane firmly against the sealing strip 36 which it engages to minimize leakage of air past such seal from the high pressure portion of the aileron chamber 20" to the low pressure portion.

Consequently in this modification of my invention the moment tending to swing the aileron elements back to neutral position, or resisting their swinging from neutral position, will be substantially only that produced by the differential in the air pressures acting on such aileron elements rearwardly of their respective sealing strips 36, one engaging the vane 15' and the other sealing the space between the aileron elements. As in the construction shown in Fig. 2, the differential in air pressures on the opposite sides of vane 15', with the exception of the slight force exerted by it on one of the aileron elements, as mentioned above, will be transmitted to the wing through the pivot 16' and its supporting bracket 17' which is integral with the wing 1, independently of the aileron elements. To that extent the aileron plates will be relieved of equivalent differential pressure, and the restoring moment on them will be reduced correspondingly, as described in conjunction with the construction of Fig. 2.

I claim as my invention:

1. In an aircraft, a fixed airfoil, a control surface swingably supported from the trailing portion of said fixed airfoil and including elements spaced apart to define a cavity therebetween in its forward portion, partition means extending generally spanwise of such control surface, supported from said fixed airfoil while permitting control movement of said control surface relative thereto and dividing such cavity fore and aft into two portions each underlying one of said elements, and means affording communication between said two cavity portions and the exteriors of said spaced elements, respectively.

2. In an aircraft, a fixed airfoil, a control surface swingably supported from the trailing portion of said fixed airfoil and including elements spaced apart to define a cavity therebetween in its forward portion, and partition means extending generally spanwise of such control surface, supported from said fixed airfoil while permitting control movement of said control surface relative thereto and dividing such cavity fore and aft into two portions, sealed against direct intercommunication, said two cavity portions communicating with the exterior portions of the control surface respectively adjacent thereto to equalize the air pressure on the opposite sides of said elements.

3. In an aircraft, a fixed airfoil, a control surface swingably supported from the trailing portion of said fixed airfoil and including elements spaced apart transversely of the control surface to define a cavity therebetween in its forward portion, a vane supported from said fixed airfoil independently of said control surface and extending generally chordwise of the control surface within such cavity, means interengaged between the trailing edge of said vane and the wall of said control surface cavity, and cooperating with said vane to divide the cavity fore and aft into two portions, and means affording communication between said two cavity portions and the exteriors of said spaced elements, respectively.

4. In an aircraft, a fixed airfoil, a control surface swingably supported from the trailing portion of said fixed airfoil and including elements spaced apart transversely of the control surface to define a cavity therebetween in its forward portion, a vane supported from said fixed airfoil independently of said control surface and extending generally chordwise of the control surface within such cavity, a flexible sealing membrane secured to the trailing edge of said vane and to the wall of said control surface cavity, and cooperating with said vane to divide the cavity fore and aft into two portions, and means affording communication between said two cavity portions and the exteriors of said spaced elements, respectively.

5. In an aircraft, a fixed airfoil, a control surface swingably supported from the trailing portion of said fixed airfoil and including elements spaced apart transversely of the control surface to define a cavity therebetween in its forward portion, a vane, pivot means supporting said vane from said fixed airfoil independently of said control surface for disposition extending generally chordwise of the control surface within such cavity, sealing means interengaged between the trailing edge of said vane and the wall of said control surface cavity, and cooperating with said vane to divide the cavity fore and aft into two portions sealing means interengaged between the leading edge of said vane and the trailing edge of said fixed airfoil, and means affording communication between said two cavity portions and the exteriors of said spaced elements, respectively.

6. In an aircraft, a fixed airfoil, a control surface swingably supported from the trailing portion of said fixed airfoil and having flanges at its opposite sides projecting forwardly to a location adjacent to the trailing portion of said fixed airfoil but spaced slightly therefrom, to define a cavity in the forward portion of said control surface between said flanges communicating at its sides with the exterior of the control surface at each of the respective sides thereof, and partition means extending generally fore and aft and generally spanwise of such control surface, supported from said fixed airfoil while permitting control movement of said control surface relative thereto, and dividing such control surface cavity into two portions sealed against direct intercommunication.

7. In an aircraft, a fixed airfoil, a control surface swingably supported from the trailing portion of said fixed airfoil and having flanges at its opposite sides projecting forwardly to a location adjacent to the trailing portion of said fixed airfoil but spaced slightly therefrom, to define a cavity in the forward portion of said control surface between said flanges communicating at its sides with the exterior of the control surface at each of the respective sides thereof, a fixed vane supported in cantilever fashion by its forward edge from said fixed airfoil and extending generally chordwise of the control surface within such cavity, and sealing means interengaged between the trailing edge of said vane and the wall of said control surface cavity, and cooperating with said vane to divide the cavity fore and aft into two portions.

8. In an aircraft, a fixed airfoil, a control surface swingably supported from the trailing portion of said fixed airfoil and having flanges at its opposite sides projecting forwardly to a location adjacent to the trailing portion of said fixed airfoil but spaced slightly therefrom, to define a cavity in the forward portion of said control surface between said flanges communicating at its sides with the exterior of the control surface at each of the respective sides thereof, a vane, pivot means supporting said vane from said fixed airfoil independently of said control surface for disposition extending generally chordwise of the control surface within such cavity, sealing means interengaging the leading edge of said vane and the trailing edge of said fixed airfoil, and a flexible sealing membrane secured to the trailing edge of said vane and to the wall of said control surface cavity, and cooperating with said vane to divide the cavity fore and aft into two portions sealed against direct intercommunication.

9. In an aircraft, a fixed airfoil, a control surface including two plate elements swingably supported from the opposite surfaces of said fixed airfoil, respectively, each so supported for swinging relative to the other, and each plate element forming one side of said control surface, the leading portions of said elements being spaced apart to define a cavity therebetween, means effecting a seal between the trailing portions of said control surface elements in various swung positions thereof, partition means supported from said fixed airfoil independently of said control surface elements and extending generally chordwise therebetween, dividing such cavity fore and aft into two portions, sealing means interengaged between the leading edge of said vane and the trailing edge of said fixed airfoil, and means affording communication between said two cavity portions and the exteriors of said spaced elements, respectively.

10. In an aircraft, a fixed airfoil, a control surface including two plate elements swingably supported from the opposite surfaces of said fixed airfoil, respectively, each so supported for swinging relative to the other, and each plate element forming one side of said control surface, the leading portions of said elements being spaced apart to define a cavity therebetween, means effecting a seal between the trailing portions of said control surface elements in various swung positions thereof, a vane, pivot means supporting said vane from said airfoil independently of said control surface elements for disposition extending generally chordwise of the control surface within the cavity between said control surface elements, means interengaged between the trailing edge of said vane and one of said control surface elements, and cooperating with said vane to divide the cavity into two portions, sealing means interengaged between the leading edge of said vane and the trailing edge of said fixed airfoil, and means affording communication between said two cavity portions and the exteriors of said spaced elements, respectively.

11. In an aircraft, a fixed airfoil, a control surface swingably supported from the trailing portion of said fixed airfoil and including elements spaced apart transversely of the control surface to define a cavity therebetween in its forward portion, a vane, pivot means supporting said vane from said fixed airfoil independently of said control surface for disposition extending generally chordwise of the control surface within such cavity, and for swinging about an axis extending spanwise of the control surface and located generally centrally between the leading and trailing edges of said vane, sealing means interengaged between the leading edge of said vane and the trailing portion of said fixed airfoil, sealing means interengaged between the trailing edge of said vane and the wall of said control surface cavity, said two sealing means cooperating with said vane to divide the cavity fore and aft into two portions sealed against direct intercommunication in various swung positions of said control surface elements and means affording communication between said two cavity portions and the exteriors of said spaced elements, respectively.

12. In an aircraft, a fixed airfoil, a control surface swingably supported from the trailing portion of said fixed airfoil and having flanges at its opposite sides projecting forwardly to a location adjacent to the trailing portion of said fixed airfoil but spaced slightly therefrom, to define a cavity in the forward portion of said control surface between said flanges communicating at its sides with the exterior of the control surface at each of the respective sides thereof, a vane, pivot means supporting said vane from said fixed airfoil independently of said control surface for disposition extending generally chordwise of the control surface within such cavity, and for swinging about an axis extending spanwise of the control surface and located generally centrally between the leading and trailing edges of said vane, sealing means interengaged between the leading edge of said vane and the trailing portion of said fixed airfoil, and a flexible sealing membrane secured to the trailing edge of said vane and to the wall of said control surface cavity, said sealing means and said sealing membrane cooperating with said vane to divide the cavity fore and aft into two portions sealed against direct intercommunication in various swung positions of said control surface.

13. In an aircraft, a fixed airfoil, a control surface swingably supported from the trailing portion of said fixed airfoil and having flanges at its opposite sides projecting forwardly to a location adjacent to the trailing portion of said fixed airfoil but spaced slightly therefrom, to define a cavity in the forward portion of said control surface between said flanges communicating at its sides with the exterior of the control surface at each of the respective sides thereof, a vane, pivot means supporting said vane from said fixed airfoil independently of said control surface for disposition extending generally chordwise of the control surface within such cavity, and for swinging about an axis extending spanwise of the control surface and located generally centrally between the leading and trailing edges of said vane, a flexible sealing membrane secured to the leading edge of said vane and to the trailing portion of said fixed airfoil, and a flexible sealing membrane secured to the trailing edge of said vane and to the wall of said control surface cavity, said two sealing membranes cooperating with said vane to divide the cavity fore and aft into two portions sealed against direct intercommunication in various swung positions of said control surface.

14. In an aircraft, a fixed airfoil, a control surface including two plate elements swingably supported from the opposite surfaces of said fixed airfoil, respectively, each so supported for swinging relative to the other, and each plate element forming one side of said control surface, the leading portions of said elements being spaced apart to define a cavity therebetween, means effecting a seal between the trailing portions of said control surface elements in various swung positions thereof, a vane, pivot means supporting said vane from said airfoil independently of said control surface elements for disposition extending generally chordwise of the control surface within the cavity between said control surface elements, and for swinging about an axis extending spanwise of the control surface and located generally centrally between the leading and trailing edges of said vane, sealing means interengaged between the leading edge of said vane and the trailing portion of said fixed airfoil, sealing means interengaged between the trailing edge of said vane and at least one of said control surface elements, said two sealing means cooperating with said vane to divide the cavity fore and aft into two portions sealed against direct intercommunication in various swung positions of said control surface elements, and means affording communication between said two cavity portions and the exteriors of said spaced elements, respectively.

15. In an aircraft, a fixed airfoil, a control surface including two plate elements swingably supported from the opposite surfaces of said fixed airfoil, respectively, each so supported for swinging relative to the other, the outer surface of each plate forming one side of said control surface and the inner surface of each plate having a ridge extending spanwise and located generally centrally between the leading and trailing edges of the plate element, the portions of said control surface elements forward of such ridges being spaced apart to define a cavity therebetween, a sealing strip carried by each control surface element extending spanwise thereof along its ridge, a vane, pivot means supporting said vane from said airfoil independently of said control surface elements for disposition extending generally chordwise of the control surface within the cavity between said control surface elements, and for swinging about an axis extending spanwise of the control surface and located generally centrally between the leading trailing edges of said vane, and sealing means interengaged between the leading edge of said vane and the trailing portion of said fixed airfoil, said sealing strips serving, when said control surface elements are swung in one direction from neutral position, one to effect a seal between the control surface element carrying it and the other control surface element, and the other between the control surface element carrying it and the trailing edge of said vane, said latter sealing strip and said sealing means cooperating with said vane to divide the cavity fore and aft into two portions sealed against direct intercommunication in various swung positions of said control surface elements, and means affording communication between said two cavity portions and the exteriors of said spaced elements, respectively.

16. In an aircraft, a fixed airfoil, a control surface including two plate elements swingably supported from the opposite surfaces of said fixed airfoil, respectively, each so supported for swinging relative to the other, the outer surface of each plate forming one side of said control surface and the inner surface of each plate having a ridge extending spanwise and located generally centrally between the leading and trailing edges of the plate element, the portions of said control surface elements forward of such ridges being spaced apart to define a cavity therebetween, a sealing strip carried by each control surface element extending spanwise thereof along its ridge, a vane, pivot means supporting said vane from said airfoil independently of said control surface elements for disposition extending generally chordwise of the control surface within the cavity between said control surface elements, and for swinging about an axis extending spanwise of the control surface and located generally centrally between the leading trailing edges of said vane, and a wiping sealing member carried by the leading edge of said vane in wiping engagement with the trailing portion of said fixed airfoil, to effect a seal therebetween in various swung positions of said vane and control surface elements, said sealing strips serving, when said control surface elements are swung in one direction from neutral position, one to effect a seal between the control surface element carrying it and the other control surface element, and the other between the control surface element carrying it and the trailing edge of said vane, said latter sealing strip and said wiping sealing member thus cooperating with said vane to divide the cavity fore and aft into two portions sealed against direct intercommunication in various swung positions of said control surface elements, and means affording communication between said two cavity portions and the exteriors of said spaced elements, respectively.

17. In an aircraft, a fixed airfoil, a control surface swingably supported from the trailing portion of said fixed airfoil and including elements spaced apart to define a general cavity therebetween in its forward portion, partition means extending generally spanwise of such control surface, between the base wall of said cavity and the trailing portion of said fixed airfoil, and dividing such cavity, fore and aft, into two spaces each underlying one of said elements, means coacting with said partition means, effecting a seal at its opposite edges with said cavity base wall and said fixed airfoil trailing portion, to prevent direct communication by flow of air as between said two cavity spaces, and means affording communication between each of said two cavity spaces and the exteriors of said spaced elements, respectively.

ROBERT PLATH.

REFERENCES CITED

The following references are of record in the file of this patent:

UNITED STATES PATENTS

| Number | Name | Date |
|---|---|---|
| 1,710,673 | Bonney | Apr. 23, 1929 |

Certificate of Correction

Patent No. 2,506,939                                          May 9, 1950

ROBERT PLATH

It is hereby certified that errors appear in the printed specification of the above numbered patent requiring correction as follows:

Column 12, line 24, strike out "and" and insert the same before "trailing" same line; line 63, strike out "and" and insert the same after "leading" in line 62;

and that the said Letters Patent should be read with these corrections therein that the same may conform to the record of the case in the Patent Office.

Signed and sealed this 8th day of August, A. D. 1950.

[SEAL]

THOMAS F. MURPHY,
                                           *Assistant Commissioner of Patents.*